Sept. 28, 1926.
N. M. STANLEY
1,601,653
VENDING APPARATUS FOR SPECTACLES
Filed Sept. 13, 1924
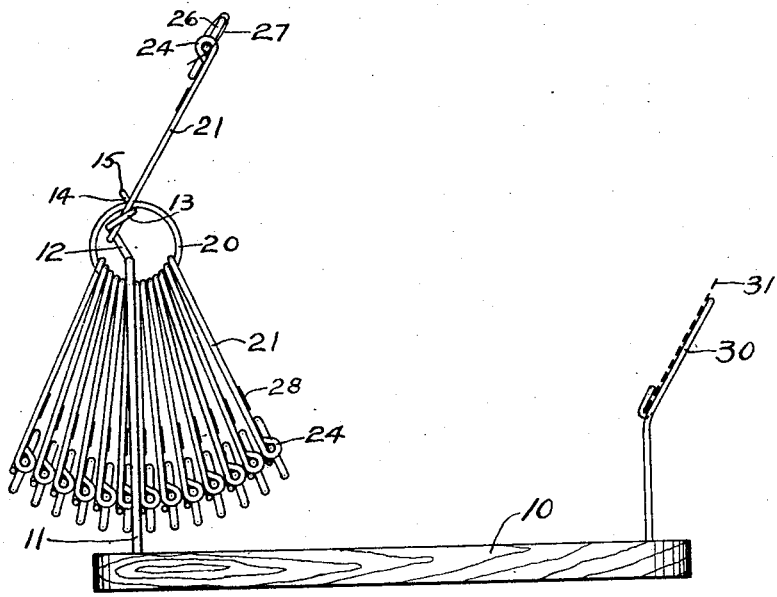
FIG. 2
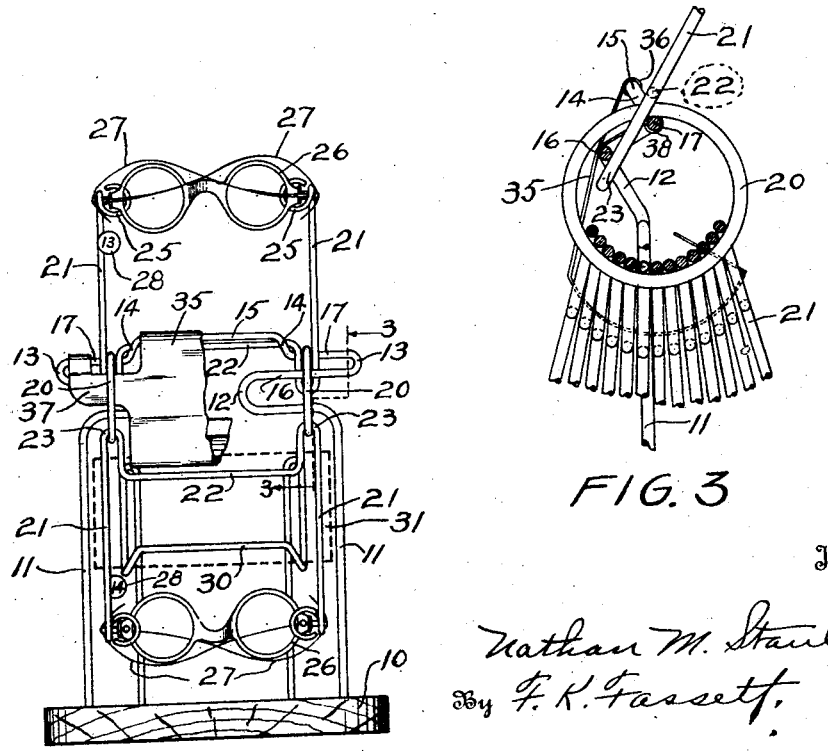
FIG. 1
FIG. 3
Inventor
Nathan M. Stanley,
By F. K. Fassett,
Attorney Patented Sept. 28, 1926.

1,601,653

UNITED STATES PATENT OFFICE.

NATHAN M. STANLEY, OF DAYTON, OHIO, ASSIGNOR TO THE STANLEY OPTICAL COMPANY, OF DAYTON, OHIO, A CORPORATION OF OHIO.

VENDING APPARATUS FOR SPECTACLES.

Application filed September 13, 1924. Serial No. 737,468.

This invention relates to apparatus for use in vending spectacles, where the purchaser is expected to select from a number of pairs of spectacles the pair best suited to his eyes. There are many persons whose eyes are normal or practically so, but who, because of their age, feel the need of spectacles when reading or doing other close work. Such persons can very easily select from a number of pairs of spectacles the pair which best fits their cases, provided proper facilities are afforded them for trying the spectacles. In fact the selection of spectacles for such persons, even when the patient is in the hands of an expert optometrist, is determined by the patient himself, the principal function of the optometrist being to direct the patient so that his selection shall be made under proper conditions; i. e., with the test-chart in the proper position with reference to and the proper reading distance from the patients' eyes.

For various reasons it is desirable to provide facilities enabling persons to fit themselves with spectacles. For example, in rural communities, and even in small cities, where there is not enough business to warrant a trained optometrist establishing himself, it is to the advantage of many of the residents to be able to purchase spectacles from local druggists or other merchants with whom they deal. And even in larger cities, especially in outlying sections, a similar need is felt. As merchants, and even druggists, usually, are unskilled in optical matters, it is desirable, and very much to the interest of the customers, to provide means whereby a customer may himself select a pair of spectacles under conditions substantially similar to those which would be prescribed by a skilled optometrist. The principal object of my invention is to provide apparatus for this purpose. Another object is to provide apparatus so simple and easy of operation that anyone can use it without special instruction, and even without assistance or advice from the merchant offering the spectacles for sale. Still another object is to produce apparatus of the character described at a very low cost, so low, in fact, that manufacturers or jobbers can afford to furnish the apparatus free of charge to a merchant who will make an initial purchase of spectacles of a reasonable size.

I shall now describe my invention, using one embodiment thereof for the purpose of illustration, and in describing this embodiment I shall refer to the accompanying drawing, in which, Fig. 1 is a front view of my apparatus, showing a pair of No. 13 spectacles in position to be tried by the customer;

Fig. 2 is a side view, and

Fig. 3 is a fragmental detail showing the construction of a certain portion of the apparatus, partly in section on line 3—3 of Fig. 1.

Mounted on a base 10, is a frame or support, extending vertically upward from the base, the legs of this frame being indicated by the numeral 11. At their upper ends the legs 11 are formed into horizontally extending loops 12 and 13, the two loops 12, only one of which is visible in Fig. 1, extending toward each other and the loops 13 extending outward or away from each other. Having completed the two loops 13 the heavy wire of which the frame is made starts upward again a short distance, as at 14—14, and the two sides of the frame are united by the horizontal portion 15. The foregoing description is really an inversion, for as a matter of fact the whole frame is made of a single piece of wire formed by a series of bends, beginning with 14—14, and when all of the bends have been made the ends, the legs 11, are forced into holes in the base 10. While at first glance the various parts of this frame, as seen in Fig. 1, appear to lie in the same plane, referring to Fig. 3 it will be seen that this is not so. There it is seen that the horizontal member 16, which is common to loops 12 and 13, lies considerably forward of the plane occupied by the legs 11; the tie member 15 is also somewhat forward. The horizontal member 17, on the other hand, lies to the rear of this median plane. The purpose of this arrangement will appear later.

A large ring 20 hangs on each member 17 and encircles the related loops 12 and 13. Upon these rings are hung a plurality of spectacle carriers. Each carrier comprises a pair of arms, 21—21, extending laterally from a central member or yoke 22, the union of the arms to the yoke being through loops 23, which extend laterally from the yoke in an opposite direction from that of the arms. It is these loops which engage the rings 20, and normally the carriers hang from the rings in a compact bunch, somewhat as keys hang on a key ring. The carriers are made of resilient wire, and the end of each arm is bent forward to form two loops or eyes. One of the loops, 24, extends perpendicularly with reference to the plane occupied by the carrier as a whole, the returning end of the wire then being bent into the second loop, 25, which lies approximately in said plane and extends toward the other arm of the carrier. The eyes 24—24 afford receptacles for the projecting hinges of the spectacle frames 26 and the loops 25 serve as guides or aligners, keeping the spectacles in a position parallel to the arms of the carrier. The arms 21 are bent so that they normally incline slightly toward each other, and it is necessary to pull them apart to place a pair of spectacles between them. Because of their tendency to incline toward each other the arms hold the spectacle frame securely. After the frame is in place on the carrier the temples 27 are hooked around the projecting hinges of the spectacle frames and thus kept from impeding the movements of the carriers. Each carrier is provided with a plate 28 bearing a number, and spectacles of corresponding number are always mounted on the respective carriers.

Mounted on the base 10 in a suitable position is a rack 30 adapted to hold an optical test-chart 31. In Figs. 1 and 2 a chart is indicated with dotted lines. To bring a pair of spectacles into position for viewing the chart the carrier on which the spectacles are mounted is raised from the bunch of carriers, inverted, and the loops 23—23 projecting from the yoke of the carrier are inserted in the loops 13 of the supporting frame. The yoke is then placed behind the member 15, thus causing the portions of the yoke contiguous to the loops 23 to rest on the short members 14 of the frame, and imparting to the carrier the leaning position it occupies in Fig. 2. The purpose of placing the members 15 and 16 forward, and members 17 back of the median plane of the frame will now be apparent upon referring to Figs. 2 and 3. The loops 23 bear against the members 16 and 17, and thus the carrier is supported in a position to maintain the spectacles in a correct position and the proper reading distance from the chart 31. By bringing one carrier after another to this position the customer is able to select the pair of spectacles best suited to his needs.

As the rings 20 merely hang on the members 17, and encircle the loops 12 and 13, a carrier can be transferred from the front to the back of the depending bunch, or vice versa, by simply lifting the rings slightly by means of the carrier which is being transferred, so that the loops 23 of the carrier can pass the members 17. The carriers can be transferred two or more at a time, if desired, so as to quickly gain access to a particular carrier.

For the purpose of simplifying the use of my apparatus and to make the places where the loops of the carriers are to be inserted more conspicuous, I provide a plate 35, which covers considerable of the apparatus. At its upper edge this plate is formed around the cross member 15, as at 36. At each side ears 37 extend from the plate having portions which are bent around the members 17, as at 38. (See Fig. 3.) Between the main portion of the plate and these extensions, spaces are left for insertion of the loops 23. The rings 20 prevent total detachment of the carriers and nothing remains for the customer to do but insert the loop in the proper places. If desired some instructive inscription may be placed on the plate 35.

In using my system a dealer will have one or more of these apparatuses fitted up with spectacles. They may be kept in a show case or even left out where customers can get to them at once. Each equipment may contain spectacles of a different quality, to be sold at different prices. Preferably the dealer should provide a table of suitable height, and a chair for the customer to use while making his selection. Or if the counter is a suitable height the customer might stand up. Having gained access to the apparatus the customer, without assistance or advice from the dealer, proceeds to select a pair of spectacles. Having done this the dealer can then note the number on the carrier bearing the chosen pair and taking from his stock a pair of spectacles of the same number deliver it to the customer. Or the customer may remove from the carrier the pair of spectacles he has selected. After the transaction has been completed the dealer can replace the spectacles taken from the carrier by a similar pair taken from stock.

It is clear from the foregoing description that my apparatus not only provides means whereby a customer can fit himself with spectacles of the class referred to, but as will be seen, it is also very compact and convenient to store when not in use. And yet it affords the maximum of convenience for the person who is selecting spectacles for himself. The bunch of carriers being down close to the base it takes up very little room and it is quite out of the way. The carriers are of such proportions that when a person is trying a pair of spectacles there is not only ample room for his face between the arms of the carrier, but the yoke and the support to which the carrier is attached while in use is below his chin. He can therefore place his nose against the bridge of the spectacle mounting, so as to bring the lenses into exactly the correct position with reference to his eyes. In brief, he tests the spectacles under conditions just the same as though he had them on his face in the ordinary way. Finally, the manner of attaching the spectacles to the frame is so simple and the way to remove them from the carrier is so obvious, that the customer can easily remove the selected ones from its carrier, making the system "self serving" in all that the word implies.

While I have disclosed and described what I at present regard as the preferred embodiment of my invention, I do not want it understood that the invention is limited to the form shown. Various structural modifications are possible without departing from the spirit of my invention or going beyond the scope of my claims.

What I claim as my invention is as follows:

1. In apparatus of the character described, a plurality of independently movable carriers, each adapted to carry a pair of spectacles, a test-chart, and means for securing said carriers one at a time in a position with the lenses of the spectacles they carry in a correct position with reference to and the proper distance from said chart to enable a person to select the pair of spectacles best suited to his eyes.

2. In apparatus of the character described, a plurality of carriers depending from a relatively fixed support, each adapted to carry a pair of spectacles, a test-chart, means enabling said carriers to be raised one at a time from their depending position, and means for securing the raised carrier in a position with the lenses of the spectacles they carry in a correct position with reference to and the proper distance from said chart to enable a person to select the pair of spectacles best suited to his eyes.

3. In apparatus of the character described, a stationary support, a plurality of carriers attached thereto, each adapted to carry a pair of spectacles, said carriers normally depending from the support in a compact bunch; means enabling the carriers to be moved one or more at a time from one side of the bunch to the other, to gain access to any particular carrier, a test-chart, and means for securing said carriers one at a time in a position with the lenses of the spectacles they carry in a correct position with reference to and the proper distance from said chart to enable a person to select the pair of spectacles best suited to his eyes.

4. In apparatus of the character described, a ring, a plurality of spectacle carriers hung on said ring, enabling any carrier to be isolated, leaving the others hanging from the ring in a compact bunch, means supporting the ring, and means for supporting the isolated carrier.

5. In apparatus of the character described, a ring, a plurality of spectacle carriers hung on said ring, enabling any carrier to be isolated, leaving the others hanging from the ring in a compact bunch, means supporting the ring, and means for supporting the isolated carrier in a position with the lenses of the spectacles it carries in a correct position with reference to and the proper distance from said chart to enable a person to select the pair of spectacles best suited to his eyes.

6. In apparatus of the character described, a plurality of independent spectacle carriers each adapted to carry a single pair of spectacles, means for attaching a pair of spectacles to the carrier in a predetermined position with reference thereto, a test-chart, and means whereby any one of said carriers may be isolated from the other carriers and mounted in a position such that the lenses of said spectacles are correctly positioned with reference to and the proper reading distance from said chart.

7. In apparatus of the character described, a carrier comprising a pair of arms extending from a yoke, means at the end of each arm for connecting it to one end of a pair of spectacles, a stationary support, and means for attaching said yoke thereto, so as to hold the spectacles carried by the arms in a predetermined position, enabling a person to place his eyes to the lenses and view a suitably positioned test-chart as though the spectacles were on the person.

8. In apparatus of the character described, a carrier comprising a pair of arms extending from a yoke, means for attaching a pair of spectacles to the ends of the arms, extensions projecting from said yoke in a direction opposite to that of the arms, and a support having recesses to receive said projections for the purpose of supporting the carrier and holding the spectacles it carries in a desired position with respect to a test-chart.

9. In apparatus of the character described, a plurality of carriers comprising a pair of arms extending from a yoke, means for attaching a pair of spectacles to the ends of the arms, a pair of rings, means attaching each of said yokes to both rings, a support on which said rings hang, while the carriers depend from the rings, and permitting the carriers to be moved at will around the rings so as to allow any carrier to be raised from the bunch and inverted, and means for attaching the inverted carrier to said support, whereby to place the spectacles carried thereby in a desired position with reference to a test-chart.

10. In apparatus of the character described, a plurality of carriers depending in a compact bunch from a support, each carrying a single pair of spectacles, and means enabling a customer to separate any one of the carriers from the bunch and secure it rigidly to said support in a position where the lenses of the spectacles it carries will be the proper distance from a test-chart to enable the customer to view the chart for test purposes.

11. In apparatus of the character described, a carrier for a pair of spectacles, comprising two resilient arms mounted upon a yoke, each arm having a terminal with a recess to receive the hinge at one end of a pair of spectacles, said arms tending to move toward each other so as to securely retain a pair of spectacles, while being separable to insert the hinges in said recesses or remove the same therefrom.

12. In apparatus of the character described, a carrier for a pair of spectacles, comprising two resilient arms mounted upon a yoke, each arm having a terminal with a recess to receive the hinge at one end of a pair of spectacles, and an aligning member against which a portion of the spectacle frame lies, whereby the spectacles are maintained in a predetermined position with reference to the arms, said arms tending to approach each other and thereby holding firmly the spectacles they carry, but being sufficiently flexible to permit their separation to insert or remove the spectacles.

13. In apparatus of the character described, a carrier for a single pair of spectacles, comprising arms extending from a yoke, means for detachably mounting a pair of spectacles on the ends of the arms and for maintaining them in a predetermined position with reference thereto, and means for attaching the yoke to a support with the arms extending upward, the arms being of such length as to bring the yoke below a person's chin when he looks through the spectacles.

NATHAN M. STANLEY.

Certificate of Correction.

It is hereby certified that in Letters Patent No. 1,601,653, granted September 28, 1926, upon the application of Nathan M. Stanley, of Dayton, Ohio, for an improvement in "Vending Apparatus for Spectacles," an error appears in the printed specification requiring correction as follows: Page 2, line 3, strike out the word "forward"; and that the said Letters Patent should be read with this correction therein that the same may conform to the record of the case in the Patent Office.

Signed and sealed this 19th day of October, A. D. 1926.

[SEAL.]
WM. A. KINNAN,
*Acting Commissioner of Patents.*